US012570516B2

(12) United States Patent
Dissanayake

(10) Patent No.: US 12,570,516 B2
(45) Date of Patent: Mar. 10, 2026

(54) SYSTEMS AND METHODS FOR USE IN DISPENSING BIOPHARMACEUTICAL MATERIALS

(71) Applicant: Regeneron Pharmaceuticals, Inc., Tarrytown, NY (US)

(72) Inventor: Tikiri Jean Dissanayake, Clifton Park, NY (US)

(73) Assignee: Regeneron Pharmaceuticals, Inc., Tarrytown, NY (US)

( * ) Notice: Subject to any disclaimer, the term of this patent is extended or adjusted under 35 U.S.C. 154(b) by 108 days.

(21) Appl. No.: 18/503,948

(22) Filed: Nov. 7, 2023

(65) Prior Publication Data

US 2024/0150165 A1 May 9, 2024

Related U.S. Application Data

(60) Provisional application No. 63/382,731, filed on Nov. 8, 2022.

(51) Int. Cl.

*B67D 7/02* (2010.01)
*A61J 1/14* (2023.01)
*B67D 7/76* (2010.01)

(52) U.S. Cl.

CPC .......... *B67D 7/0288* (2013.01); *A61J 1/1418* (2015.05); *B67D 7/76* (2013.01)

(58) Field of Classification Search

CPC ..... B67C 3/225; B65B 2039/009; B65B 3/06; B65D 41/0407

See application file for complete search history.

(56) References Cited

U.S. PATENT DOCUMENTS

| | | | | |
|---|---|---|---|---|
| 6,234,335 | B1 * | 5/2001 | Gee | B29C 66/5346 604/905 |
| 7,575,126 | B2 * | 8/2009 | Kemper | F16K 15/144 220/717 |
| 8,631,953 | B2 * | 1/2014 | Pavlovic | B29C 45/1671 215/253 |
| 9,315,281 | B2 * | 4/2016 | Dissanayake | B65B 3/22 |
| 2006/0226113 | A1 * | 10/2006 | Clark | B65D 51/002 215/247 |
| 2014/0103077 | A1 | 4/2014 | Zumbrum | |
| 2014/0137978 | A1 | 5/2014 | Dissanayake | |
| 2021/0395071 | A1 | 12/2021 | Zumbrum et al. | |

OTHER PUBLICATIONS

International Search Report for PCT/US2023/078981, Jul. 1, 2024, 3 pages.

* cited by examiner

*Primary Examiner* — Timothy L Maust
(74) *Attorney, Agent, or Firm* — Bookoff McAndrews, PLLC

(57) ABSTRACT

A system for dispensing biopharmaceutical materials, the system including: a plurality of containers, wherein each of the plurality of containers comprises a screw-on cap having a low temperature silicone stopper; a distribution manifold connected to the plurality of containers, wherein the distribution manifold comprises a plurality of distribution conduits and a plurality of discharge conduits and wherein the distribution conduits and the discharge conduits are in fluid communication with each other; a bulk reservoir for holding the biopharmaceutical materials; and a filter assembly positioned between the bulk reservoir and the distribution manifold.

22 Claims, 5 Drawing Sheets

SYSTEMS AND METHODS FOR USE IN DISPENSING BIOPHARMACEUTICAL MATERIALS

CROSS REFERENCE TO RELATED APPLICATIONS

This application claims priority to U.S. Provisional Application No. 63/382,731, filed on Nov. 8, 2022, which is incorporated by reference herein in its entirety.

TECHNICAL FIELD

Aspects of the present disclosure relate generally to biopharmaceutical materials, and more particularly to systems and methods for dispensing biopharmaceutical materials.

INTRODUCTION

Biopharmaceutical aqueous materials are often dispensed into containers to be frozen, later thawed, and thereafter formulated or transported for further packing into retail-sized packaging. Conventionally, the dispensing process occurs under sanitary conditions in a clean environment (e.g., in an ISO 5 class hood) in which the biopharmaceutical materials are manually transferred from a bulk reservoir into one or more receiving containers (e.g., by removing the caps of the receiving containers within the hood and then pumping the biopharmaceutical material from the bulk reservoir into each open bottle). Samples may be taken at one or more points during the dispensing process and later tested to ensure the integrity of the biopharmaceutical materials prior to the freezing and/or final packaging thereof.

The present disclosure is directed to addressing issues encountered during the conventional dispensing techniques described above. The background description provided herein is for the purpose of generally presenting the context of the disclosure. Unless otherwise indicated herein, the materials described in this section are not prior art to the claims in this application and are not admitted to be prior art, or suggestions of the prior art, by inclusion in this section.

The entire disclosure of commonly owned U.S. Pat. No. 9,315,281, which discloses a pre-sterilized system for dispensing biopharmaceutical materials, is incorporated by reference herein except for any definitions, subject matter disclaimers or disavowals, and except to the extent that the incorporated material is inconsistent with the express disclosure herein, in which case the language in this disclosure controls.

SUMMARY OF THE DISCLOSURE

According to certain aspects of the disclosure, methods and systems are disclosed for facilitating flow of biopharmaceutical materials from a bulk reservoir to a plurality of receiving containers via passage through a distribution manifold.

In one aspect, a system for dispensing biopharmaceutical materials, the system comprising: a plurality of containers, wherein each of the plurality of containers comprises a screw-on cap having a low temperature silicone stopper; a distribution manifold connected to the plurality of containers, wherein the distribution manifold comprises a plurality of distribution conduits and a plurality of discharge conduits, and wherein the distribution conduits and the discharge conduits are in fluid communication with each other; and a filter assembly fluidly coupled to the distribution manifold.

In another aspect, a method for dispensing biopharmaceutical materials, the method including: flowing the biopharmaceutical materials from a bulk reservoir storing the biopharmaceutical materials to a manifold coupled to a plurality of receiving containers; and supporting a plurality of distribution conduits of the manifold by a plurality of discharge conduits of the manifold, wherein a terminal end of each of the plurality of discharge conduits is passed through a cap of one of the plurality of receiving containers and wherein a low temperature silicone stopper is integrated into the cap and surrounds the discharge conduit.

In yet another aspect, a receiving container for storing biopharmaceutical materials at low temperatures, the receiving container including: a cap configured to screw onto a neck of the receiving container, wherein the cap comprises one or more openings that enable connection of one or more tubes to an interior of the receiving container; a low-temperature silicone stopper positioned in a hollowed out portion of the cap, wherein the low-temperature silicone stopper surrounds the one or more tubes within the interior of the cap.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate the disclosed embodiments, and together with the description, serve to explain the principles of the disclosed embodiments. There are many aspects and embodiments described herein. Those of ordinary skill in the art will readily recognize that the features of a particular aspect or embodiment may be used in conjunction with the features of any or all of the other aspects or embodiments described in this disclosure. In the drawings.

DETAILED DESCRIPTION OF THE EMBODIMENTS

Figure 1:
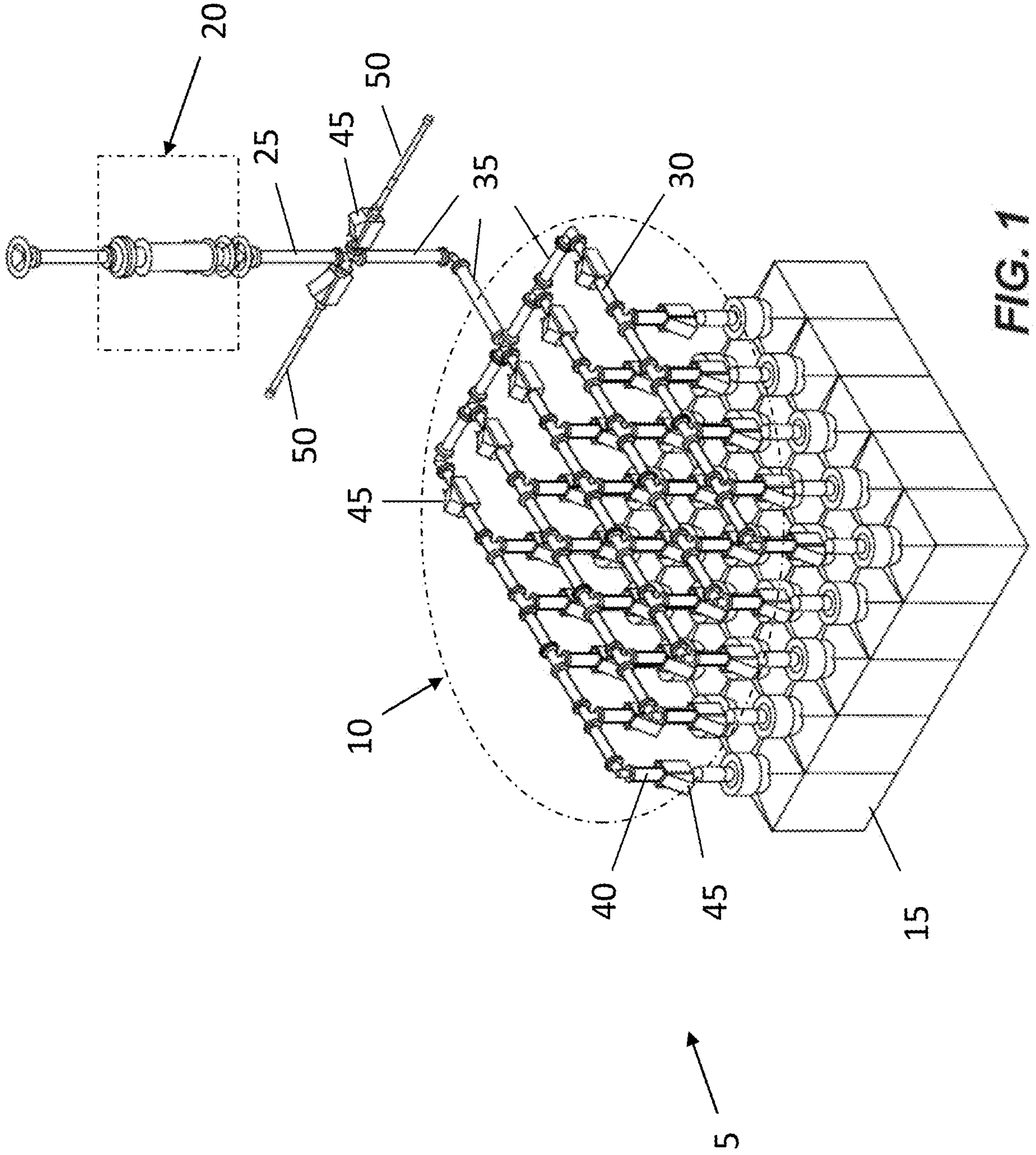
FIG. 1 depicts a perspective view of a system for dispensing biopharmaceutical materials, according to various aspects of the present disclosure.

The terminology used below may be interpreted in its broadest reasonable manner, even though it is being used in conjunction with a detailed description of certain specific examples of the present disclosure. Indeed, certain terms may even be emphasized below; however, any terminology intended to be interpreted in any restricted manner will be overtly and specifically defined as such in this Detailed Description section. Both the foregoing general description and the following detailed description are exemplary and explanatory only and are not restrictive of the features, as claimed.

In this disclosure, the term "based on" means "based at least in part on." The singular forms "a," "an," and "the" include plural referents unless the context dictates otherwise. The term "exemplary" is used in the sense of "example" rather than "ideal." The terms "comprises," "comprising," "includes," "including," or other variations thereof, are intended to cover a non-exclusive inclusion such that a process, method, or product that comprises a list of elements does not necessarily include only those elements, but may include other elements not expressly listed or inherent to such a process, method, article, or apparatus. The term "individual" may be used interchangeably with other terms such as "user" or "student", unless explicitly delineated otherwise. Relative terms, such as, "substantially" and "generally," are used to indicate a possible variation of ±10% of a stated or understood value.

Conventional techniques for dispensing biopharmaceutical materials require that the biopharmaceutical materials be exposed to the uncertainties of open-air dispensing as well as the uncertainties of manual dispensing by one or more individuals tasked to perform such dispensing. These uncertainties may lead to contamination of the biopharmaceutical materials and potential danger to a patient having such contaminated materials administered thereto. Additionally, some containers and/or other components attached to the containers that are subsequently frozen after having received the biopharmaceutical materials have been shown to not withstand the extreme cold (e.g., at approximately −80 Celsius) that certain drugs need to be stored at. In these instances, the containers, and/or components thereof, may crack or break and leave the biopharmaceutical materials subject to exposure and contamination.

Accordingly, embodiments of the present disclosure provide systems and methods for dispensing biopharmaceutical materials that minimize a risk of contamination of the biopharmaceutical materials when it is transferred from a final processing container to plurality of containers for further transport and/or storage thereof. Additionally, embodiments disclosed herein provide for more robust container components that, e.g., can withstand the extreme cold associated with freezing and storage.

Reference will now be made in detail to the exemplary embodiments of the present disclosure described below and illustrated in the accompanying drawings. Wherever possible, the same reference numbers will be used throughout the drawings to refer to same or like parts. Additional objects and advantages of the embodiments will be set forth in part in the description that follows, and in part will be obvious from the description, or may be learned by practice of the embodiments. It is to be understood that both the foregoing general description and the following detailed description are exemplary and explanatory only and are not restrictive of the claims.

Referring to FIG. 1, a perspective view of a system for dispensing biopharmaceutical materials is provided. The system 5 may include a manifold 10, a plurality of containers 15 connected to the manifold 10, and a filter assembly 20 that may be interposed between a bulk reservoir (not shown) that holds a quantity of processed biopharmaceutical materials (e.g., bulk or formulated drug substances, etc.) and the manifold 10.

In an embodiment, the manifold 10 may include an inlet conduit 25 (e.g., tubing c-flex 374, ½" and ¾") that may be configured to receive the biopharmaceutical materials transferred from the bulk reservoir. The filter assembly 20 (e.g., a SARTOPORE 2 0.45/0.2 μm, 6000 $cm^2$, 1½" TC filter) may be interposed between and connected to the inlet conduit 25 and the bulk reservoir and may inhibit contaminants from entering into the containers 15 (e.g., 1 L Pharmatainer) via the manifold 10. In an embodiment, the inlet conduit 25 may be positioned offset from the manifold 10 and the containers 15 (i.e., the inlet conduit 25 may be positioned next to the manifold 10 rather than over top of the manifold 10 and the containers 15). It is important to note, however, that such a positioning is not limiting and that the inlet conduit 25 may be positioned in other positions with respect to the manifold 10 and/or the containers 15 (e.g., overtop of the manifold and the containers).

In an embodiment, the manifold 10 may include one or more distribution conduits 30 (e.g., tubing STHT-C, ⅜"×⅝") that are located above and run across the containers 15. The distribution conduits 30 may receive the biopharmaceutical materials from feeder conduits 35 (e.g., tubing STHT-C, ⅜"×⅝"), as further illustrated in FIGS. 2-3. The received biopharmaceutical materials may be delivered from the distribution conduits 30 to the containers 15 via discharge conduits 40 that are perpendicularly connected to the distribution conduits 30.

Figure 2:
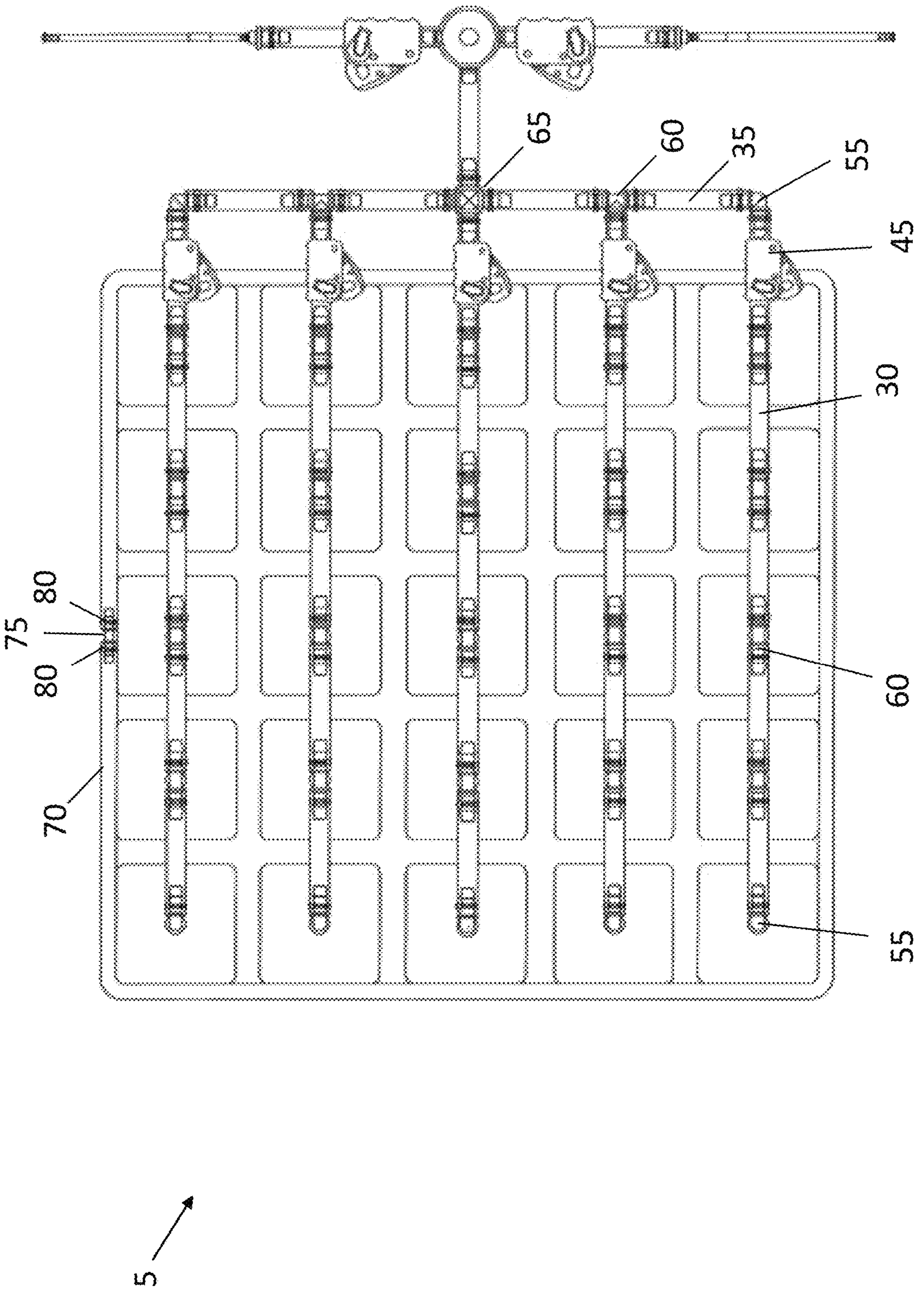
FIG. 2 depicts a top view of a system for dispensing biopharmaceutical materials, according to various aspects of the present disclosure.

As illustrated in FIGS. 1-2, the distributions conduits 30 may be arranged in rows that extend lengthwise down the set of containers 15. Ultimately, the size and/or shape of the distribution conduits 30 may be dictated by the number and/or possible arrangement of the containers 15. More particularly, a row of distribution conduits 30 may be increased or decreased by adding or removing tubing shafts and appropriate connectors. In an embodiment, substantially all of the distribution conduits 30 may be at the same height relative to each other. In an embodiment, the various conduits of the manifold 10 connected to the containers 15 are thus configured (e.g., shaped, dimensioned, and having sufficient stiffness) to be connected to one another such that the manifold 10 is self-supporting and remains standing during a dispensing operation. In an embodiment, the manifold 10 may be free-draining (e.g., by gravity). Additionally or alternatively, a pump (not illustrated) may be attached to the system 5 to draw the biopharmaceutical materials from the bulk reservoir and push it through to the containers 15.

In an embodiment, the flow of biopharmaceutical materials between the feeder conduits and the distribution conduits may be controlled by clamps 45 (e.g., a PURE-FIT TC clamp ⅜"-¾"). More particularly, each clamp 45 may be placed between each distribution conduit 30 row and the corresponding feeder conduit 35. In an embodiment, each clamp 45 may be installed over the tubing shaft in the conventional fashion or, alternatively, may be put together after the relevant tubing shaft is integrated within the greater manifold 10. In an embodiment, clamps 45 may also be positioned between the distribution conduits 30 and the discharge conduits 40 to releasably control flow into or out of the containers 15 during the dispensing process.

In an embodiment, the system 5 may be configured to secure one or more sampling containers (not pictured) to one or both sampling container conduits 50 (e.g., tubing STHT-C, ⅜"×⅝"). The flow of biopharmaceutical materials into one or both connected sampling containers may be controlled by clamps 45 positioned on the sampling container conduits 50. Once the sample has been taken into the sampling container(s), it may be isolated and removed from the sampling container conduits 50 in a manner that is sealed relative to the ambient environment, facilitating allocation and distribution. The biopharmaceutical materials held in the sampling container(s) may later be analyzed to confirm the quality of the biopharmaceutical materials held in containers 15. The analysis of the contents of the sampling container(s) may negate the need to analyze the contents of each of the containers 15, thereby reducing the chances for contamination.

Referring now to FIG. 2, a top view of the system 5 is provided. Such a view may provide a clearer illustration of the components involved in the implementation of each distribution conduit 30 row. Taking the bottom-most row as a representative example, each distribution conduit 30 row may be connected to a feeder conduit 35 by a connector (e.g., an elbow connector 55 (e.g., VP connector elbow ⅜") that joins two corner-positioned tubing shafts, a T-shaped connector 60 (e.g., VP connector T ⅜") that joins three tubing shafts, and/or a cross connector 65 (e.g., VP connector cross ⅜") that joins four tubing shafts). A clamp 45 for controlling the flow of biopharmaceutical materials from the feeder conduits 35 to the distribution conduits 30 may be positioned on a distribution conduit tubing shaft. In an embodiment, each row of distribution conduits may be composed of a plurality of tubing shafts connected together by T-connectors 60 and may terminate with an elbow connector 55 (i.e., joining the end of the distribution conduit 30 row with a discharge conduit 40). FIG. 2 further depicts a tube wrap 70 (e.g., Tubing STHT-C, ¼"×½") that Encompasses the Perimeter of the series of containers to provide containment support. The tube wrap 70 may be a continuous piece of tubing that is connected together by a straight connector 75 (e.g., VP connector straight ¼") and where each connecting end of the tube wrap 70 is secured by an ear clamp 80 (e.g., OETIKER ear clamp ½").

Figure 3:
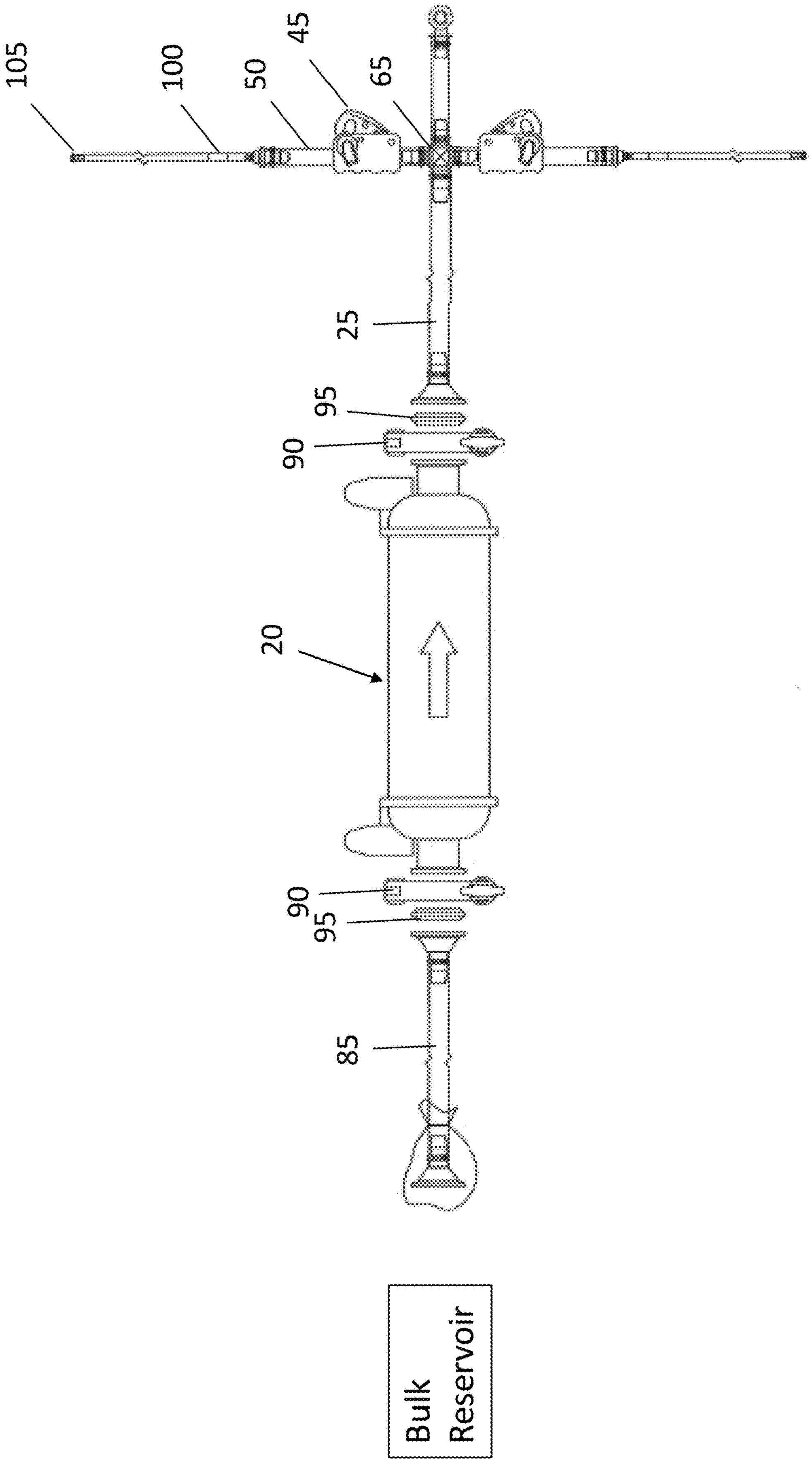
FIG. 3 depicts an exploded view of a filter portion, disconnected from the system illustrated in FIG. 1, according to various aspects of the present disclosure.

Referring now to FIG. 3, an exploded view of the filter assembly 20 is provided. As depicted in FIG. 3, a filter assembly 20 may be present for inhibiting or otherwise preventing the passage of contaminants in the direction of the manifold 10 through intake conduit 25. The filter assembly 20 may be connected to the inlet conduit 25 on a downstream end and coupled to an introduction conduit 85 (currently presented as packaged in a poly bag for sanitation) (e.g., tubing C-FLEX 374, ⅛"×¼") on an upstream end. More particularly, connection of the filter assembly 20 to either the intake conduit 25 or the introduction conduit 85 may be facilitated by utilization of a bioclamp 90 (e.g., BIOCLAMP 1"1.5") and gasket 95 (e.g., GASKET 1" ½"). The filter assembly 20 may receive, via the introduction conduit 85, biopharmaceutical materials from the bulk reservoir. In an embodiment, a non-contacting pump (not illustrated) (e.g., a peristaltic pump) may be located between the bulk reservoir and the filter assembly 20 and may pump the biopharmaceutical materials from the bulk reservoir toward the manifold 10. In an embodiment, the intake conduit 25 may be coupled to a bulk reservoir directly (i.e., without the presence of the filter assembly 20). In particular, intake conduit 25 could be connected to such a reservoir by a sterile connecting device such that a filter utilized to prevent degradation caused by a sanitary connection between the conduit and the reservoir would not be necessary, as would be understood by one of ordinary skill in the art.

In an embodiment, each of the sampling container conduits 50 may be usable to secure and release a sampling container (not illustrated). In an embodiment, a clamp 45 may be positioned on each sampling container conduit 50 and may abut a cross-connector 65 (e.g., VP Connector Cross Red, ½"×⅜"×"⅜"×⅜"). Opening of the clamp 45 may enable pharmaceutical materials to flow from the sampling container conduit to the sampling container conduit 50 via a sampling tubing shaft (e.g., Tubing C-FLEX 374, ⅛"×¼"). In an embodiment, a quick seal 100 (e.g., MILLIPORE NOVASEAL ⅛"×¼") may be located on the sampling container conduit 50. Such a quick seal may be an aseptic-type seal which allows opposite portions of the seal to be disconnected relative to one another sealing both disconnected portions to inhibit contamination. A plug 105 (e.g., VP Press-in Plug ⅛") may be located at a terminal end of the sampling tubing shaft, which may be pressed in when sampling is not occurring.

Figure 4:
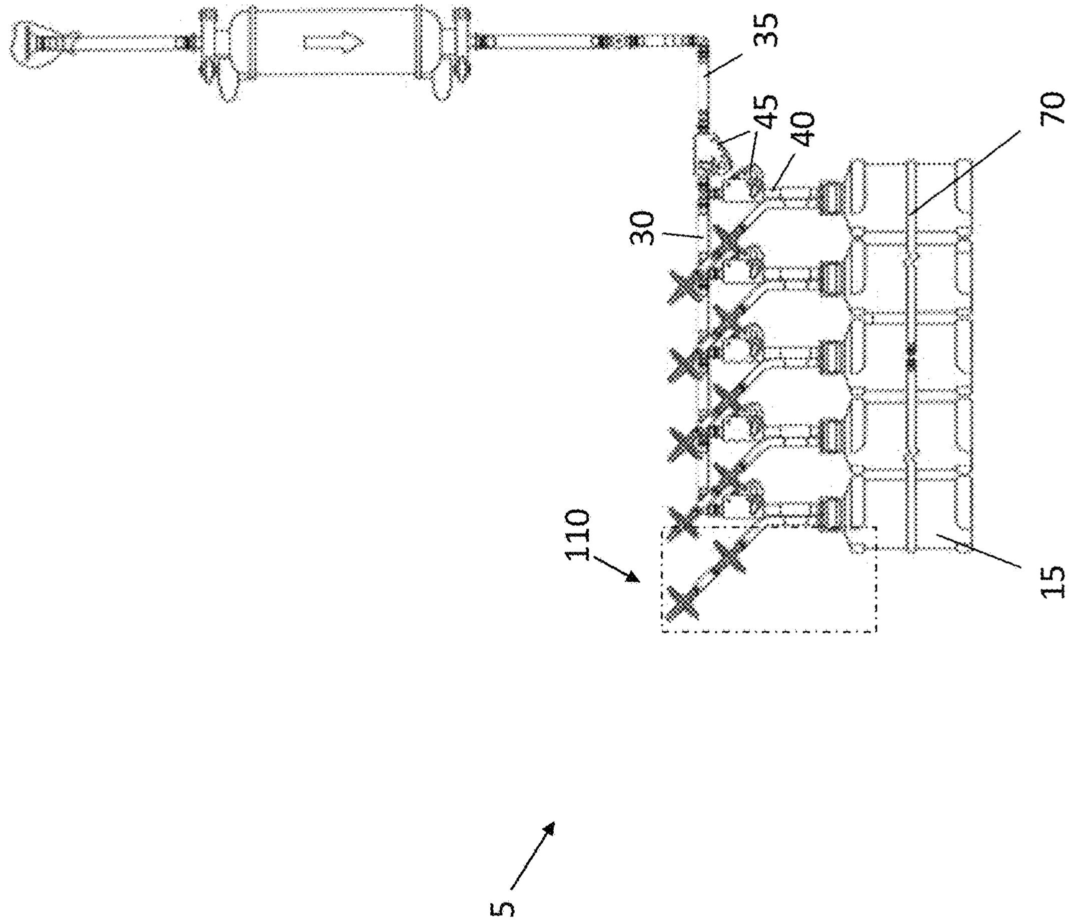
FIG. 4 depicts a side view of a system for dispensing biopharmaceutical materials, according to various aspects of the present disclosure.

Referring now to FIG. 4, a side view of the system 5 is depicted. Such a perspective provides an additional view of the tube wrap 70 that secures the containers 15 in a fixed position. Additionally, as can be better seen, each container 15 may be in fluid communication with a corresponding distribution conduit 30 via discharge conduit 40. As previously discussed, the flow of biopharmaceutical materials between distribution conduit 30 and discharge conduit 40 may be controlled by manual manipulation of clamp 45. In an embodiment, each container may additionally contain a hydrophobic filter assembly 110. The hydrophobic filter assembly 110 may allow air to vacate the containers 15 when the biopharmaceutical materials enter therein while simultaneously inhibiting contamination (e.g., from the ambient environment) from entering into the containers 15.

Figure 5:
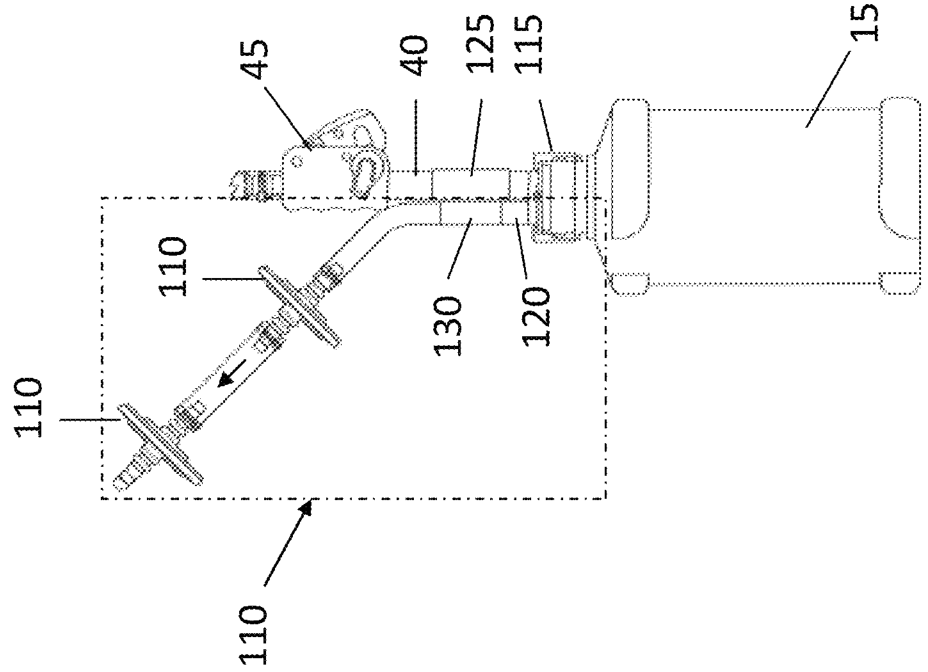
FIG. 5 depicts a perspective view of a container connected to a portion of a manifold of the system illustrated in FIG. 1, according to various aspects of the present disclosure.

Referring now to FIG. 5, a closer, perspective view of a single container 15 and associated components is provided. In an embodiment, each container 15 may be a sterile, single-use bottle that may be configured to hold a variety of different types of biopharmaceutical materials. Each container 15 may be outfitted with a screw-on cap 115 that may contain integrated openings to receive discharge conduit 40 tubing shaft and air ventilation shaft 120. Additionally, the cap 115 may contain an integrated, low temperature silicone stopper. The low temperature silicone stopper may surround the tubing shafts 40, 120 and may be able to resist extremely low temperatures (e.g., −80° C. to −112° C.) without cracking.

In an embodiment, each container 15 may include a second quick seal 125 (e.g., a MILLIPORE NOVASEAL ⅜"×⅝") that may be utilized when attaching and/or removing the container 15 from the manifold 10. In another embodiment, each container 15 may also include a third quick seal 130 (e.g., a MILLIPORE NOVASEAL ¼× ½") that may be utilized to allow the hydrophobic filter assembly 110 to be removed while maintaining an appropriate sealed environment for the container 15. In an embodiment, the filter assembly 110 may allow air to vacate from the container 15 via passage through air ventilation shaft 120 (e.g., Tubing STHT-C, ⅜"× "⁴⁄₈") and vent filters 135 (e.g., Vent Filter Air MIDISART, 0.2 μM, ¼"-⅜").

In an embodiment, a method for dispensing biopharmaceutical materials includes pumping the biopharmaceutical materials from a bulk reservoir by a pump through filter assembly 20 to manifold 10. The biopharmaceutical materials may enter feeder conduits 35 and flow therefrom into distribution conduits 30 and containers 15. A user may open and close various clamps 45 on distribution conduits 30 and discharge conduits 40 to direct the biopharmaceutical materials which may flow by gravity or the force of the pump from feeder conduits 35 into the various containers 15 by the opening and closing of such clamps 45. During the distribution of biopharmaceutical materials into the various containers 15, one of clamps 45 may be opened to allow flow of the biopharmaceutical materials into one or more sampling containers. First quick seals 100 on each of discharge conduits 40 may be sealed and a portion of each seal separated from manifold 10 to allow removal of the containers 15 therefrom and transportation of the containers to an appropriate facility for further processing, e.g., freezing, formulation, or other processing steps prior to packaging thereof into retail size containers.

In an embodiment, the conduits described above (e.g., intake conduit 25, distribution conduits 30, feeder conduits 35, and discharge conduits 40) may all be silicone tubing or formed of a material which does not degrade in the presence of biopharmaceutical materials or otherwise contaminate such materials. The biopharmaceutical materials could be but would not be limited to, any aqueous cell culture medias, chromatography buffers or therapeutic molecules suspended in specially formulated solutions. The containers 15 may be, e.g., one (1) liter biotainers or any other container of various sizes formed of a material or having an interior which inhibits degradation or contamination of biopharmaceutical materials held therein. The containers 15 are preferably rigid or semi-rigid such that they are self-supporting and retain their shape when holding biopharmaceutical materials. Such containers 15 could also be connected to one another (e.g., using a propylene connector such that the containers remain abutting one another during the dispensing of the biopharmaceutical materials).

Embodiments of the present disclosure may include the following features:

Item 1. A system for dispensing biopharmaceutical materials, the system comprising:
- a plurality of containers, wherein each of the plurality of containers comprises a screw-on cap having a low temperature silicone stopper;
- a distribution manifold connected to the plurality of containers, wherein the distribution manifold comprises a plurality of distribution conduits and a plurality of discharge conduits, and wherein the distribution conduits and the discharge conduits are in fluid communication with each other; and
- a filter assembly fluidly coupled to the distribution manifold.

Item 2. The system of item 1, wherein a top of the screw-on cap comprises two openings to receive: A) an end of one of the plurality of discharge conduits and B) an end of a ventilation tubing shaft.

Item 3. The system of item 2, wherein the low temperature silicone stopper surrounds a circumference of the end of one of the plurality of discharge conduits and the end of the ventilation tubing shaft within the screw-on cap.

Item 4. The system of item 1, wherein each container of the plurality of containers comprises a hydrophobic filter assembly including a quick seal positioned on a ventilation tubing shaft that is connected to an air vent filter.

Item 5. The system of item 1, wherein the intake conduit is offset from the distribution manifold.

Item 6. The system of item 1, wherein the plurality of distribution conduits are positioned above the plurality of discharge conduits.

Item 7. The system of item 1, further comprising a plurality of clamps positioned on the distribution conduits and the discharge conduits for controlling flow of the biopharmaceutical materials into the plurality of containers.

Item 8. The system of item 1, further comprising a sampling container conduit configured to distribute a portion of the biopharmaceutical material to a sampling container.

Item 9. The system of item 8, wherein the sampling container conduit is positioned downstream of the intake conduit and upstream from a plurality of feeder conduits.

Item 10. The system of item 9, wherein the plurality of distribution conduits are positioned adjacent to the plurality of feeder conduits.

Item 11. The system of claim 1, wherein the system is configured to receive the biopharmaceutical materials from a bulk reservoir containing the materials.

Item 12. The system of claim 1, further comprising a bulk reservoir for holding the biopharmaceutical materials.

Item 13. A method for dispensing biopharmaceutical materials, the method comprising:
- flowing the biopharmaceutical materials from a bulk reservoir storing the biopharmaceutical materials to a manifold coupled to a plurality of receiving containers; and
- supporting a plurality of distribution conduits of the manifold by a plurality of discharge conduits of the manifold, wherein a terminal end of each of the plurality of discharge conduits is passed through a cap of one of the plurality of receiving containers, and wherein a low temperature silicone stopper is integrated into the cap and surrounds the discharge conduit.

Item 14. The method of item 13, wherein the flowing comprises pumping the biopharmaceutical materials from the bulk reservoir to the manifold.

Item 15. The method of item 13, wherein the plurality of distribution conduits is located above the plurality of discharge conduits.

Item 16. The method of item 15, wherein the flowing comprises flowing the biopharmaceutical materials from the plurality of distribution conduits into the plurality of receiving containers, via the plurality of discharge conduits, by a force of gravity alone.

Item 17. The method of item 13, wherein the flowing comprises controlling, via manipulation of one or more clamps positioned on the distribution conduits and the discharge conduits of the manifold, a flow of the biopharmaceutical materials.

Item 18. The method of item 13, wherein the flowing comprises flowing a portion of the biopharmaceutical materials from the bulk reservoir into a sampling container via a sampling container conduit.

Item 19. The method of item 13, wherein the flowing comprises flowing the biopharmaceutical materials from the bulk reservoir through a filter assembly.

Item 20. The method of item 13, further comprising sealing, subsequent to flowing the portion of the biopharmaceutical materials into the sampling container, the sampling container relative to the sampling container conduit.

Item 21. The method of item 13, further comprising sealing the plurality of receiving containers and the manifold relative to an ambient environment outside of the manifold and the plurality of receiving containers.

Item 22. A receiving container for storing biopharmaceutical materials at low temperatures, the receiving container comprising:
- a cap configured to screw onto a neck of the receiving container, wherein the cap comprises one or more openings that enable connection of one or more tubes to an interior of the receiving container;
- a low-temperature silicone stopper positioned in a hollowed out portion of the cap, wherein the low-temperature silicone stopper surrounds the one or more tubes within the interior of the cap.

Item 23. The receiving container of item 22, wherein the one or more tubes include: a discharge conduit and/or an air ventilation shaft.

Item 24. The receiving container of item 23, wherein the biopharmaceutical materials are introduced into the receiving container via the discharge conduit.

Item 25. The receiving container of item 22, wherein the low-temperature silicone stopper is hardy to temperatures at least as low as −80° C.

The many features and advantages of the present disclosure are apparent from the detailed specification, and thus, it is intended by the appended claims to cover all such features and advantages of the present disclosure that fall within the true spirit and scope of the disclosure. Further, since numerous modifications and variations will readily occur to those skilled in the art, it is not desired to limit the present disclosure to the exact construction and operation illustrated and described, and accordingly, all suitable modifications and equivalents may be resorted to, falling within the scope of the present disclosure.

Moreover, those skilled in the art will appreciate that the conception upon which this disclosure is based may readily be used as a basis for designing other structures, methods, and systems for carrying out the several purposes of the present disclosure. Accordingly, the claims are not to be considered as limited by the foregoing description.

What is claimed is:

1. A system for dispensing biopharmaceutical materials, the system comprising:

a plurality of containers, wherein each of the plurality of containers comprises a screw-on cap having a low temperature silicone stopper;

a distribution manifold connected to the plurality of containers, wherein the distribution manifold comprises a plurality of distribution conduits and a plurality of discharge conduits, and wherein the distribution conduits and the discharge conduits are in fluid communication with each other;

a filter assembly fluidly coupled to the distribution manifold; and an intake conduit positioned downstream of the filter assembly and upstream from the distribution manifold, wherein the filter assembly and the intake conduit are laterally offset from the distribution manifold and the plurality of containers;

wherein the distribution manifold is arranged via a plurality of rows that each extends parallel to one another and laterally away from the intake conduit; and wherein each of the plurality of distribution conduits is positioned above the plurality of discharge conduits and aligned along one of the plurality of rows with each of the plurality of rows extending across the plurality of containers that are fluidly coupled to a corresponding distribution conduit of the plurality of distribution conduits.

2. The system of claim 1, wherein a top of the screw-on cap comprises two openings to receive: A) an end of one of the plurality of discharge conduits and B) an end of a ventilation tubing shaft.

3. The system of claim 2, wherein the low temperature silicone stopper surrounds a circumference of the end of one of the plurality of discharge conduits and the end of the ventilation tubing shaft within the screw-on cap.

4. The system of claim 1, wherein each container of the plurality of containers comprises a hydrophobic filter assembly including a quick seal positioned on a ventilation tubing shaft that is connected to an air vent filter.

5. The system of claim 1, further comprising a plurality of first clamps positioned on the distribution conduits that are each configured for selectively controlling flow of the biopharmaceutical materials into the plurality of discharge conduits that are fluidly coupled to a corresponding distribution conduit of the plurality of distribution conduits; and a plurality of second clamps positioned on the discharge conduits that are each configured for selectively controlling flow of the biopharmaceutical materials into a corresponding container of the plurality of containers that is fluidly coupled to a corresponding discharge conduit of the plurality of discharge conduits.

6. The system of claim 1, further comprising a sampling container conduit configured to distribute a portion of the biopharmaceutical material to a sampling container.

7. The system of claim 6, wherein the sampling container conduit is positioned downstream of the intake conduit and upstream from a plurality of feeder conduits.

8. The system of claim 7, wherein the plurality of distribution conduits are positioned adjacent to the plurality of feeder conduits.

9. The system of claim 1, wherein the system is configured to receive the biopharmaceutical materials from a bulk reservoir containing the materials.

10. The system of claim 1, further comprising a bulk reservoir for holding the biopharmaceutical materials.

11. The system of claim 1, further comprising a tube wrap surrounding a perimeter of the plurality of containers.

12. A plurality of receiving containers for storing biopharmaceutical materials at low temperatures, each of the receiving containers comprising:

a cap configured to screw onto a neck of the receiving container, wherein the cap comprises one or more openings that enable connection of one or more tubes to an interior of the receiving container;

a low-temperature silicone stopper positioned in a hollowed out portion of the cap, wherein the low-temperature silicone stopper surrounds the one or more tubes within the interior of the cap; and a sampling container conduit configured to distribute a portion of the biopharmaceutical material to a sampling container, wherein the sampling container conduit is fluidly connected to the intake conduit via a cross connector and wherein the cross connector forms a direct fluid connection with a plurality of feeder conduits and a distribution conduit;

wherein the plurality of receiving containers are surrounded by a tube wrap that is configured to collectively contain and support the plurality of receiving containers.

13. The receiving container of claim 12, wherein the one or more tubes include: a discharge conduit and/or an air ventilation shaft.

14. The receiving container of claim 13, wherein the biopharmaceutical materials are introduced into the receiving container via the discharge conduit.

15. The receiving container of claim 12, wherein the low-temperature silicone stopper is hardy to temperatures at least as low as −80° C.

16. A method for dispensing biopharmaceutical materials, the method comprising:

flowing the biopharmaceutical materials from a bulk reservoir storing the biopharmaceutical materials through a filter assembly and an intake conduit to a manifold coupled to a plurality of receiving containers, wherein the filter assembly and the intake conduit are laterally offset from the manifold and the plurality of receiving containers; and supporting a plurality of distribution conduits of the manifold by a plurality of discharge conduits of the manifold, wherein a terminal end of each of the plurality of discharge conduits is passed through a cap of one of the plurality of receiving containers, and wherein a low temperature silicone stopper is integrated into the cap and surrounds the discharge conduit;

wherein the manifold is arranged via a plurality of rows that each extends parallel to one another and laterally away from the intake conduit; and wherein each of the plurality of distribution conduits is positioned above the plurality of discharge conduits and aligned along one of the plurality of rows with each of the plurality of rows extending across the plurality of receiving containers that are fluidly coupled to a corresponding distribution conduit of the plurality of distribution conduits.

17. The method of claim 16, wherein the flowing comprises pumping the biopharmaceutical materials from the bulk reservoir to the manifold.

18. The method of claim 16, wherein the flowing comprises flowing the biopharmaceutical materials from the bulk reservoir separately into each of the plurality of rows of the plurality of distribution conduits and into the plurality of receiving containers that are arranged along a corresponding row of the plurality of rows, via the plurality of discharge conduits, by a force of gravity alone.

19. The method of claim 16, wherein the flowing comprises:

controlling, via manipulation of one or more first clamps positioned on the distribution conduits, an initial flow of the biopharmaceutical materials into the plurality of discharge conduits that are fluidly coupled to a corresponding distribution conduit of the plurality of distribution conduits; and controlling, via manipulation of one or more second clamps positioned on the discharge conduits of the manifold, a subsequent flow of the biopharmaceutical materials into a corresponding receiving container of the plurality of receiving containers that are fluidly coupled to a corresponding discharge conduit of the plurality of discharge conduits.

20. The method of claim 16, wherein the flowing comprises flowing a portion of the biopharmaceutical materials from the bulk reservoir into a sampling container via a sampling container conduit.

21. The method of claim 20, further comprising sealing, subsequent to flowing the portion of the biopharmaceutical materials into the sampling container, the sampling container relative to the sampling container conduit.

22. The method of claim 16, further comprising sealing the plurality of receiving containers and the manifold relative to an ambient environment outside of the manifold and the plurality of receiving containers.

* * * * *